United States Patent [19]

Bergetz

[11] Patent Number: 5,127,617
[45] Date of Patent: Jul. 7, 1992

[54] SWIVEL MOUNTING ASSEMBLY FOR TELEVISION AND THE LIKE

[75] Inventor: Carl A. Bergetz, River Forest, Ill.

[73] Assignee: Peerless Industries, Inc., Melrose Park, Ill.

[21] Appl. No.: 707,679

[22] Filed: May 30, 1991

[51] Int. Cl.⁵ .................................. E04G 3/00
[52] U.S. Cl. ........................ 248/278; 108/48; 248/124
[58] Field of Search ............... 248/278, 282, 283, 284, 248/285, 286, 287, 310, 919, 920, 124; 108/48, 152

[56] References Cited

U.S. PATENT DOCUMENTS

| | | |
|---|---|---|
| 167,118 | 8/1875 | Pritchett . |
| 1,318,703 | 10/1919 | Stuchlak ............... 248/282 X |
| 1,460,928 | 7/1923 | Tilden . |
| 2,557,766 | 6/1951 | Ronfeldt . |
| 2,877,073 | 3/1959 | Malmer ................ 108/48 UX |
| 3,291,432 | 12/1966 | Lucasey . |
| 3,724,798 | 4/1973 | Lucasey . |
| 3,787,131 | 1/1974 | Reachek . |
| 4,358,214 | 11/1982 | Shull . |
| 4,386,870 | 6/1983 | Baroody . |
| 4,487,389 | 12/1984 | Ziegler ................ 248/282 |
| 4,603,996 | 8/1986 | Chen . |
| 4,662,591 | 5/1987 | Encontre . |
| 4,739,637 | 4/1988 | Strand . |
| 4,836,486 | 6/1989 | Vossoughi et al. ........ 248/278 X |
| 4,921,370 | 7/1989 | Handler et al. . |

Primary Examiner—Ramon O. Ramirez
Attorney, Agent, or Firm—Lockwood, Alex, Fitzgibbon & Cummings

[57] ABSTRACT

A mounting assembly for an electrical appliance such as a television receiver or the like that has a mounting bracket which is capable of being mounted either on a horizontal surface, such as a ceiling, or on a vertical surface, such as a wall. The mounting bracket rotatably receives a support arm which extends from the mounting bracket to a support tray upon which the appliance is mounted. The support arm has a generally vertical first portion and a generally horizontal second portion. An extension of the support arm second portion extends transversely from the support arm and supportingly contacts the supper tray, which is fixed to a pair of opposing endcaps of the extension. An adjustment means interconnects the support tray with the support arm and permits the elevation of the support tray to be selectively adjusted.

22 Claims, 3 Drawing Sheets

SWIVEL MOUNTING ASSEMBLY FOR TELEVISION AND THE LIKE

BACKGROUND AND SUMMARY OF THE INVENTION

The present invention relates generally to assemblies for mounting electrical appliances, such as television receivers and the like from ceilings or walls and, more particularly, to an improved television mounting assembly capable of rotation around both a vertical and a horizontal axis.

Various wall and ceiling mounting assemblies for electrical appliances, such as television receivers or monitors are known. Some of these assemblies support the television receiver on a support tray held by a cantilevered beam or arm extending out from the wall. Such mounting assemblies are typically only capable of adjustable movement in a single plane. Other mounting assemblies rely upon a "yoke" arrangement, in which the arms hold up opposing ends of a support tray. Both such mounting assemblies require structural members to have a substantial thickness to properly support the appliance. Additionally, most such assemblies are one piece and rely upon welded connections, rather than bolted connections, the latter of which permit the mounting assembly to be essentially portable.

The mounting assembly of the present invention provides a structurally sound mounting means for large appliances and permits the appliance, or television receiver, to be easily adjusted in two different planes. In doing so, it utilizes a minimum amount of parts which are bolted together. In this way the mounting assembly can be completely broken down and efficiently packaged for shipment. This renders the assembly "portable". Such mounting assembly can be easily manufactured and installed with a minimum amount of time and effort.

In a mounting assembly incorporating the principles of the present invention, an arm is rotatably held in a mounting bracket which is adapted to be mounted either on a wall or ceiling surface. The arm extends from the mounting bracket and has separate first and second portions angularly disposed with respect to each other. The first portion of the arm is rotatably held by the mounting bracket and extends outwardly therefrom to a second portion of the arm, to which a transverse extension is attached. The extension extends transversely from the arm and defines a member which supports an appliance support tray. The support tray lies atop the extension along its entire length. The tray is rotatably connected to opposing ends of the extension so as to permit the support tray to rotate relative to the extension without the support tray breaking contact with the extension. A vertical adjustment means extends between the arm and the support tray and permits the support tray (and the television receiver mounted thereon) to be easily adjusted in a vertical plane.

Accordingly, it is a general object of the present invention to provide an improved mounting assembly for an electrical appliance, such as a television receiver or the like, which is structurally sound and easily assembled from a minimum of parts.

Another object of the present invention is to provide a mounting assembly for television receivers and the like having an arm which extends from either a ceiling or wall mounting bracket and which arm is capable of rotation within the mounting bracket around a vertical axis and in which the arm supports a tray which, in turn, supports the television receiver, the tray being capable of rotational movement about a horizontal axis.

A further object of the present invention is to provide a mounting assembly for mounting on a flat surface, such as a wall or ceiling, which assembly includes a support arm capable of rotation around a vertical axis and a support tray held by the support arm, the support arm having vertical adjustment means capable of adjusting the angle of the support tray relative to the support arm.

Yet another object of the present invention is to provide an improved mounting assembly for a television or monitor which includes a support tray for supporting the television monitor, the support tray is mounted on a support arm, the support arm permitting the support tray to be swiveled about a vertical axis, the support arm having a transverse extension which contacts the support tray, the support tray further being mounted to opposing end portions of the support arm extension which opposing end portions are rotatable relative to the extension, thereby permitting rotation of the support tray around a generally horizontal axis without breaking contact with the extension.

A yet further object of the present invention is to provide a kit of parts for use in assembling a mounting assembly which includes a mounting bracket having a substantially planar mounting surface for mounting the same on either a wall or ceiling, a support arm which rotatably engages the mounting bracket, the support arm including an extension portion in the form of a cross-arm which defines a base to support a television support tray, wherein the support tray contacts the cross arm along its entire length and wherein the support tray is connected to rotatable end portions of the cross-arm to permit the support tray to be tilted between a pre-selected range of angles while maintaining contact with the arm.

These and other objects, features and advantages of the present invention will be apparent from a reading of the following detailed description, taken in conjunction with the accompanying drawings wherein like reference numerals refer to like parts.

BRIEF DESCRIPTION OF THE DRAWINGS

In the course of this detailed description, reference will be made to the attached drawings in which.

DETAILED DESCRIPTION OF THE PREFERRED EMBODIMENTS

Figure 1:
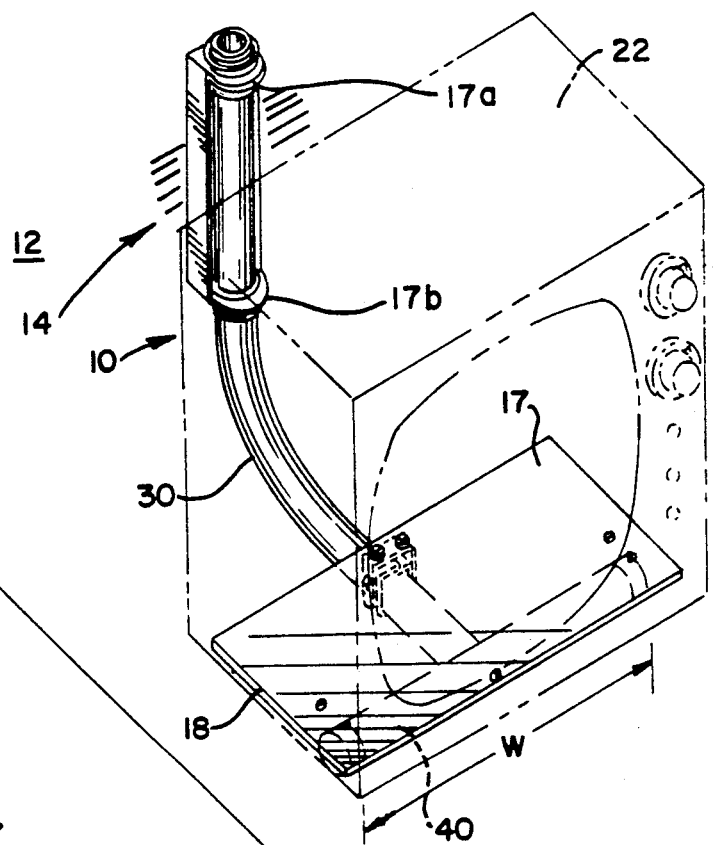
FIG. 1 is a perspective view of one embodiment of a mounting assembly constructed in accordance with the principles of the present invention.

FIG. 1 illustrates one embodiment of a mounting assembly 10 constructed in accordance with the principles of the present invention. The mounting assembly 10 is shown attached to a vertical wall surface 12 by means of a mounting bracket 14.

Figure 2:
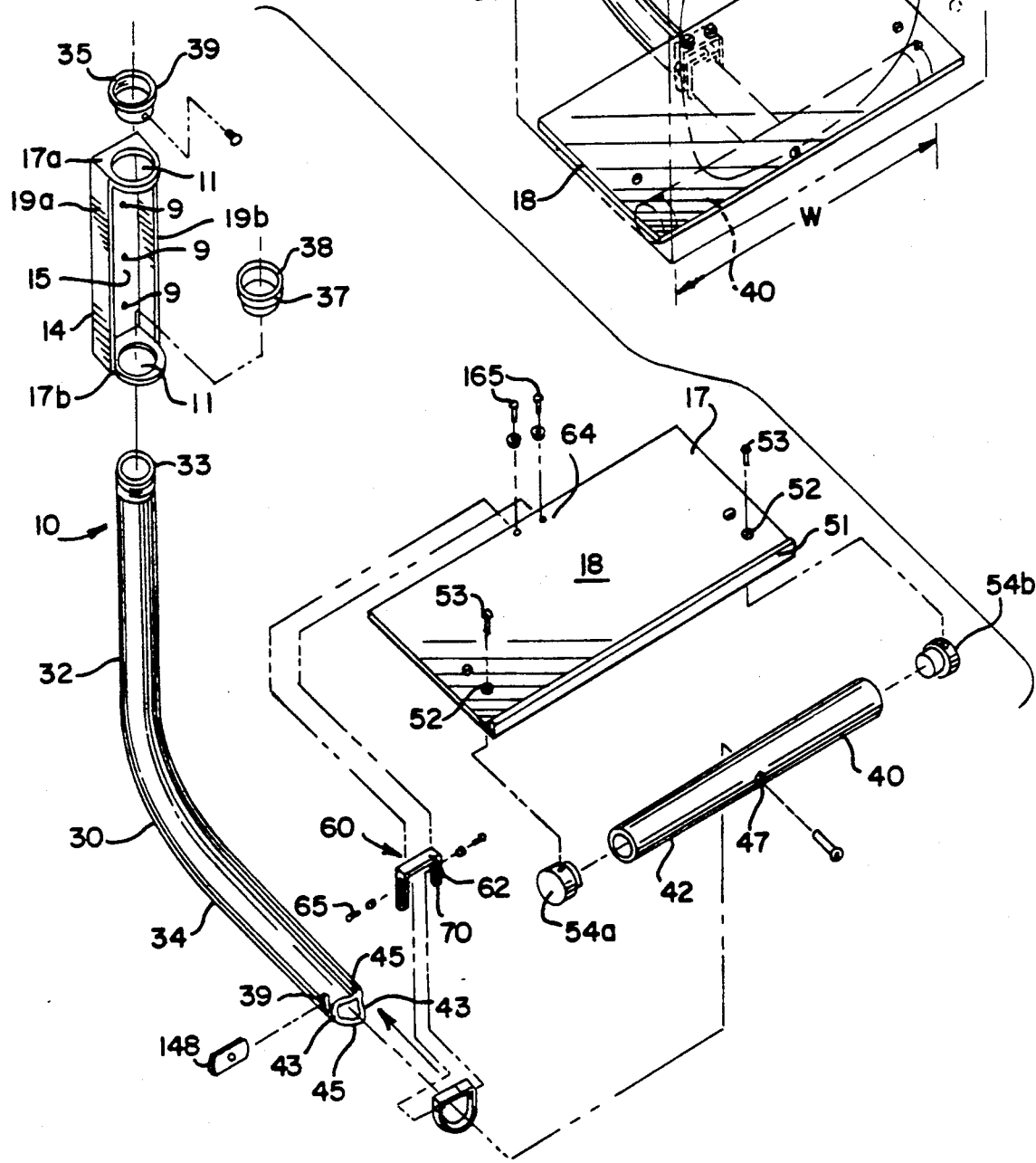
FIG. 2 is an exploded perspective view of the mounting assembly of FIG. 1.

As can be seen best from FIGS. 1 and 2, the mounting assembly includes a mounting bracket 14, a support arm 30 which engages the mounting bracket 14 and a support tray 18 which is seated on an extension 40 of the support arm 30. The support tray 18 is substantially planar in nature and provides a support surface for an electrical appliance such as a television receiver or monitor 22.

In general, the support arm 30 is rotatably held in place of the mounting bracket 14 and permits the appliance 22 to be swiveled or rotated around a vertical axis, so that a user's viewing needs can easily be accommodated. The support arm 30 supports the appliance support tray 18 along at least a substantial portion of the support tray width, W by way of an extension 40 and is further adjustably mounted to a support arm second portion 34 which permits the support tray 18 to be elevated through a preselected range.

Figure 3:
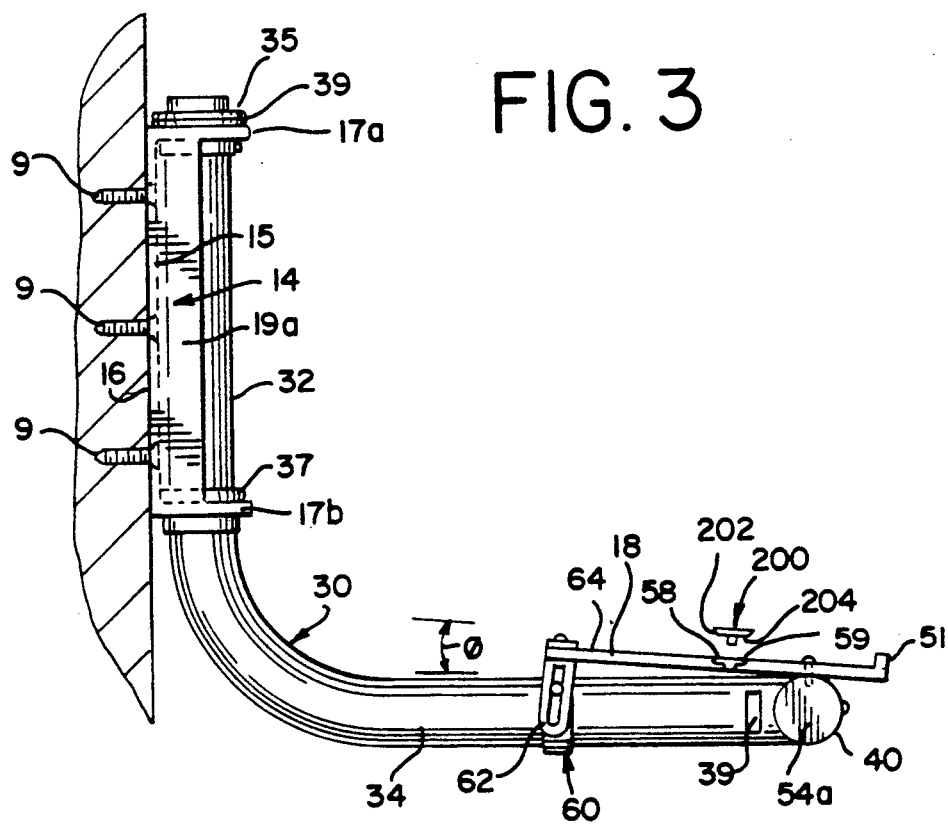
FIG. 3 is an elevational view of the mounting assembly of FIG. 1.

Turning now to the specific details of the mounting bracket 14, as shown best in FIGS. 2 and 3, the mounting bracket 14 includes a base portion 15 having a substantially planar mounting face 16 which is adapted to lie against a mounting surface, such as the vertical wall 12. Two integral end portions 17a, 17b are disposed at opposite ends of the mounting bracket 14 and are each provided with an opening 11 which are adapted to receive the first portion 32 of the support arm 30. A pair of intermediate flange portions 19a, 19b may extend vertically between the end portions 17a, 17b to provide the mounting bracket 14 with increased structural stiffness to resist any pull-out or deformation loads due to the weight of the mounting assembly components and appliance 22 and the moment applied to the same by virtue of the cantilever-type nature of the support arm 30. One or more bolts 9 may be provided to attach the mounting bracket to the wall surface. Although three such bolts 9 are shown in FIG. 3 as arranged in vertical alignment, it will be understood that any number of bolts and any particular pattern may be utilized so long as the bolt size and pattern sufficiently withstand any pull out forces.

The support arm 30, as previously described, includes a generally vertical first portion 32 and a generally horizontal second portion 34 angularly disposed from the first portion 32 and extending radially outwardly from the first portion 32. As shown in FIGS. 1-5, the support arm 30 may be most easily formed from a structural pipe, such as Schedule 40 pipe having an approximate wall thickness of 0.140 inches. The end 33 of the support arm first portion 32 is threaded and extends through the two openings 11 provided in the mounting bracket end portions 17a, 17b and the first portion 32 is held in place by one or more retaining means such as a threaded collar 35 or a bushing 37. The bushing 37 is preferably sized to slip over the support arm first portion 30 with an interference fit and is provided with a radial flange 38 which provides a surface to engage the mounting bracket end portion 17b. The retaining collar 35 is threaded and engages the threaded end 33 of the support arm and is likewise provided with a radial flange 39 which engages a support surface of the mounting bracket end portion 17a.

Figure 5:
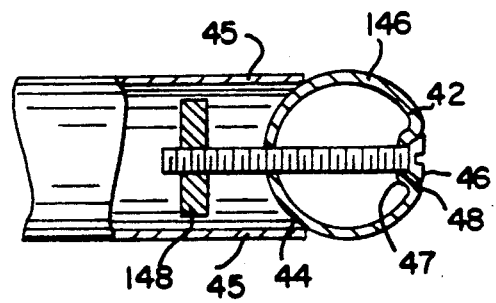
FIG. 5 is a partial cutaway view of the support arm of the mounting assembly of FIG. 1 specifically showing the details of the attachment between the support arm and its transverse extension.

At the end of the support arm second portion 34, an extension member 40, such as a cross-arm is provided in the form of a cylindrical hollow tube 42. The cross-arm 42 extends generally transversely to the support arm second portion 34 for approximately substantially the entire width W of the support tray 18. In order to provide a rigid and durable connection between the extension 40 and the support arm 30, the end 41 of the support arm second portion 34 is provided with a pair of recesses 43 which cooperate to form a generally semicircular cove 44. The cove 44 formed by the recesses 43 is preferably complementary in configuration to the exterior of the extension 42 so that the end 41 of an outer surface 146 of the second portion 34 engages at least approximately one-quarter of the circumference of the cross arm 42 as shown in FIG. 5. The recesses 43 further define a pair of opposing edges 45 which project outside of the cove 44 and engage the extension cross-arm 42.

To enhance the present invention's portability aspect, the cross-arm 42 is rigidly connected to the support arm 30 by way of a suitable fastener, such as the threaded bolt 46 shown. In this regard, the cross arm 42 is provided with a bolt hole 47 located in a recess 48. The bolt 46 passes through the sidewalls of the cross arm 42 (FIG. 5) and engages at one end thereof, an anchor or draw plate 148. The anchor plate 148 is held in place within the second portion 34 by means of a slot 39 which extends through the sidewalls thereof. During assembly, the user engages the anchor plate 148 with the bolt 46, and tightens the same to draw the extension cross-arm 42 and cove 44 into direct contact. In this regard, the edges 45 ensure that the extension 40 is properly engaged with the support arm 30. The projecting edges 45 provide a structure which resists torsional loading, that is, loads applied to the cross arm 42 by the appliance 22 which would cause the cross arm 42 to turn about the center axis of the support arm second portion 34. Thus, this construction does not require the appliance 22 to be centered exactly on the support tray 18.

Turning now to the details of the support tray 18, and as best seen in FIG. 3, it abuts the top surface 24 of the support arm extension 40 for substantially the entire length thereof. Because the support tray 18 is intended to be adjustable, as will be explained below, the tray 18 is attached to a pair of opposing endcaps 54a, 54b of the cross arm 42. The endcaps 54a, 54b extend partially into the interior of the extension 40 and are capable of rotation therein. The support tray 18 is attached to these opposing endcaps 54a, 54b, by threaded fasteners 53 which engage the endcaps 54a, 54b through openings 52 in the support tray 18. Because the distance between the openings 52 is fixed, the fasteners 53 secure the endcaps onto extension 40. Importantly, the extension endcaps 54a, 54b permit the support tray 18 to rotate through a preselected angle φ while maintaining the tray 18 in a support contact with the extension cross arm 42.

This unique structure permits the planar surface 17 of the tray 18 to be easily adjusted by the user. In this regard, the support tray 18 is preferably provided with an upwardly extending ledge 51 which serves to retain the appliance 22 thereon when the tray 18 is tilted. An additional means to retain the appliance 22 in place on the tray 18 include depressions 58 which are adapted to engage one or more lug members 200 secured to the bottom of the appliance 22, each lug having an engagement member 202 which engage a complimentary surface 59 of the depression 58 and which also includes a post 204 which projects through an opening 57 in the tray for attachment thereto by a fastener.

Figure 4:
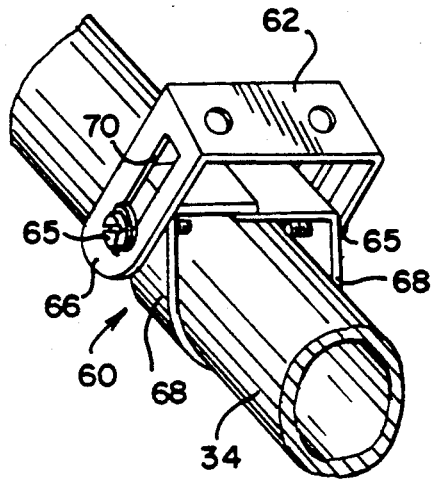
FIG. 4 is an enlarged view of the support arm of the mounting assembly of FIG. 2 specifically showing the adjustment means of the support tray.

The support tray 18 is further attached to the support arm 30 by way of a vertical adjustment means 60 which includes an adjustment strap 62 to the rear portion 64 of the tray 18 by fasteners 165. The adjustment strap 62 has a pair of downwardly extending arms 66 which engage a retainer 68 mounted on the support arm second portion 34 and secured thereto by a pair of bolts 65. As best seen in FIG. 4, the arms 66 each have a slot 70 which define a pair of adjustment tracks for the adjustment bolts 65 to ride in. When properly tightened, the adjustment bolts 65 cause the retainer 68 to securely grip the outer surface of the support arm 30.

Figure 6:
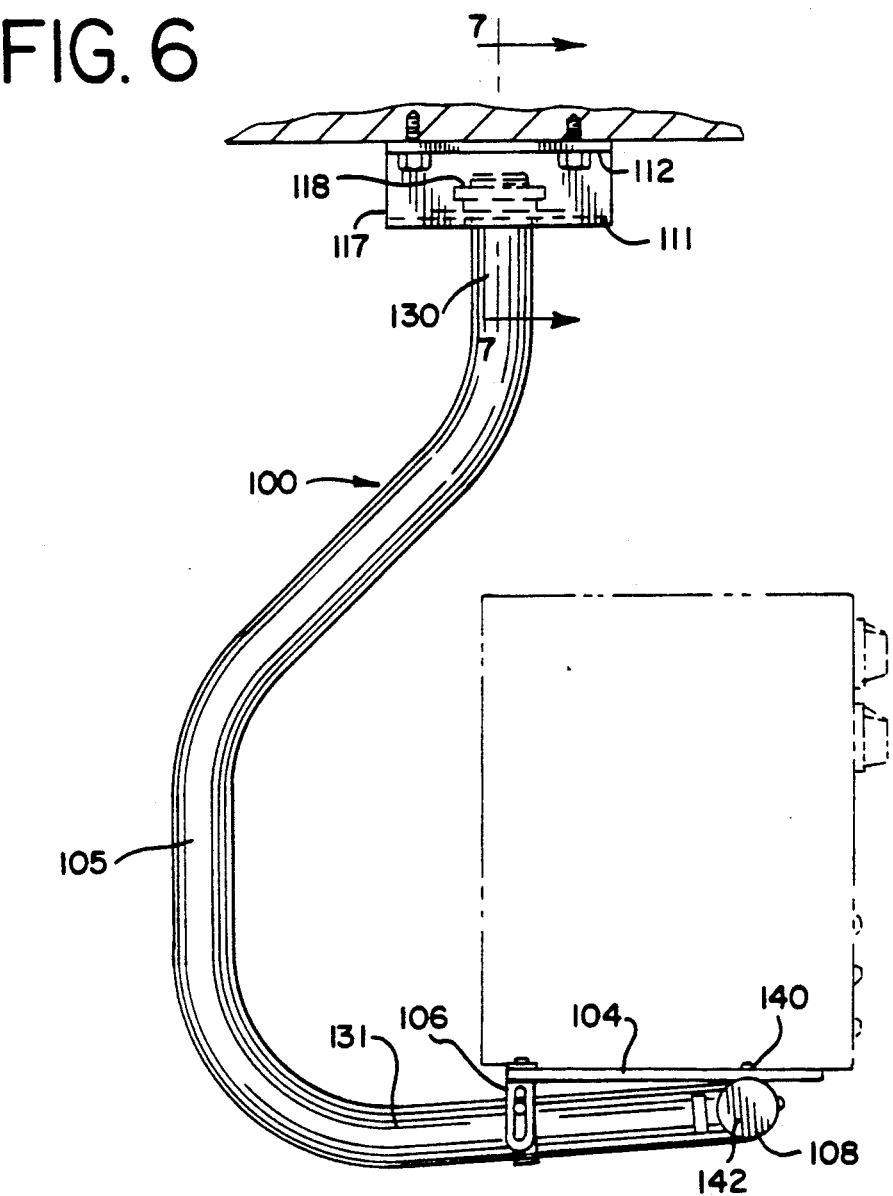
FIG. 6 is an elevation of a second embodiment of a mounting assembly constructed in accordance with the principles of the present invention.
Figure 7:
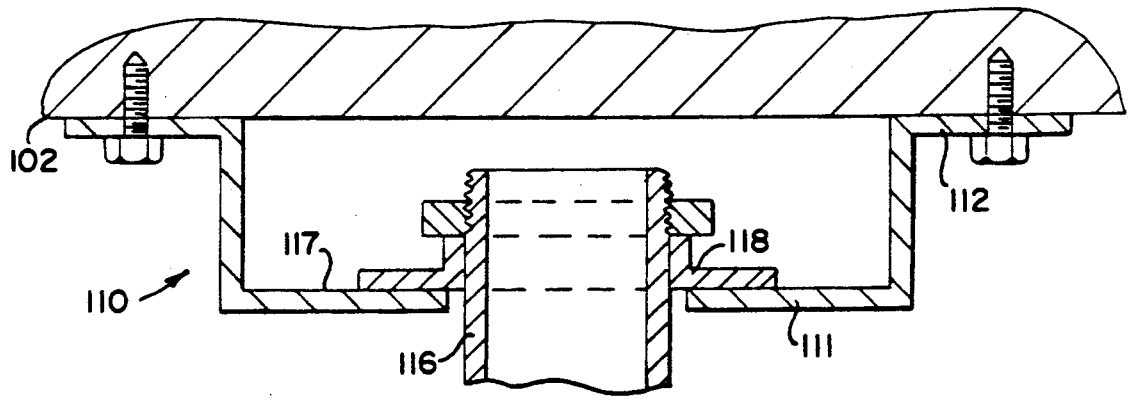
FIG. 7 is an enlarged sectional view of the mounting assembly of FIG. 6 taken along lines 7—7.

A second embodiment of a mounting assembly 100 constructed in accordance with the principles of the present invention is shown in FIGS. 6 and 7, wherein the mounting assembly 100 is specifically adapted for attachment to a horizontal surface, such as a ceiling 102. The basic details of construction of this embodiment, such as the support tray 104, adjustment means 106 and support arm extensions 108, of the mounting assembly 100 are generally the same as those described above. The major differences are in the configuration of the mounting bracket 110 and the support arm 105.

As seen in FIG. 7, the mounting bracket 110 has a channel shaped member 111, which includes a pair of substantially planar mounting surfaces 112 which flank a central portion 113. The central portion 113 has an opening 114 located therein, which opening 114 receives one end 116 of a first portion 130 of the support arm 105. The area of the channel member 111 provides a support lip or rim 117 which engages a radial flange 120 extending outwardly from a retaining collar 118. The retaining collar 118 may either engage the interior or exterior surfaces of the support arm end 116 as shown in FIG. 7 or it may engage the outer surface by way of set screws or the like.

The support arm 105 of this embodiment 100 has a somewhat "goose-neck" configuration as shown in FIG. 6 wherein it extends both rearwardly and forwardly of the vertical axis of the first embodiment, the support arm 105 includes a transverse extension 108 connected to the second portion 131 thereof. The support tray 104 is attached, as by fasteners 140, to opposing end caps 142 of the transverse extension 108 and, as mentioned above, contacts substantially the entire length of the extension 108 in a supporting manner. An adjustment means 106 extends between the support arm second portion 131 and the support tray 104.

It will be appreciated that the embodiments of the present invention that have been discussed herein are merely illustrative of a few applications of the principles of the invention. Numerous modifications may be made by those skilled in the art without departing from the true spirit and scope of the invention.

I claim:

1. A mounting assembly for electrical appliances, such as television sets comprising: mounting means adapted for attachment to a substantially planar surface, an arm member rotatably engaging the mounting means, the arm member being capable of rotational movement around a vertical axis, said arm member further including a radial flange which supportingly engages a surface of said mounting means surrounding at least one opening disposed in said mounting means, the opening being adapted to receive a first portion of the arm member therein, said arm member further including a second portion angularly extending from said arm member first portion, the arm member second portion having a transverse extension arm of a predetermined length, a support tray extending above said arm member, the support tray bearing against said transverse extension arm, said support tray being connected to said extension arm at opposing end portions thereof, the arm member opposing end portions rotatably engaging said extension arm member, thereby generally permitting limited rotational movement of said support tray relative to said arm member to provide said support tray with a range of preselected elevation angles, the mounting assembly further including means for adjusting the elevation angle of said support tray.

2. The mounting assembly of claim 1, wherein said extension arm member abuttingly engages said arm member, said arm member further including a tensioning plate disposed therein proximate to said extension arm member, said tensioning plate engaging said arm member and providing a fixed attachment point of said arm member for a tensioning element engaging said tensioning plate.

3. The mounting assembly of claim 1, wherein said arm member and said extension arm member are structural tubes.

4. The mounting assembly of claim 1, wherein said support tray elevation adjustment means includes a retainer strap secured to said arm member and an adjustment bracket which slidably engages said retainer strap, the adjustment bracket having an enclosed track containing at least one screw which engages said retainer strap, said screw permitting selective raising or lowering of said adjustment bracket relative to said retainer strap, thereby raising or lowering the elevation of said support tray.

5. The mounting assembly of claim 3, wherein said structural tubes are circular and said arm member radial flange extends from a retaining collar which threadedly engages said arm member.

6. The mounting assembly of claim 1, wherein said support tray includes an upwardly extending appliance retaining flange and said support tray includes an appliance support surface, the appliance support surface having at least one depression disposed therein which is adapted to engage a mounting lug extending from said appliance.

7. The mounting assembly of claim 6, wherein said appliance support surface includes a plurality of depressions are arranged in a preselected pattern, each of said depressions including at least one mounting engagement surface and further including an opening adapted to receive a mounting lug fastener therethrough.

8. The mounting assembly of claim 1 wherein said arm member second portion includes a cove defining two recesses in an end of said arm member second portion, the recesses being adapted to generally abuttingly engage an outer surface of said extension arm member, the arm member second portion cove further including two lip portions which also abuttingly engage the extension arm member outer surface, the two lip portions extending outwardly with respect to said recesses, whereby said two lip portions provide resistance to torque loads applied to said support tray by said appliance.

9. The mounting assembly of claim 1, wherein said mounting means includes a mounting bracket having a substantially planar mounting face adapted to engage a generally vertical planar mounting surface.

10. The mounting assembly of claim 1, wherein said mounting means includes a mounting bracket having at least one substantially planar mounting face adapted to engage a generally horizontal planar mounting surface.

11. A mounting assembly for supporting a television set from a mounting surface, such as a wall or ceiling, which mounting assembly permits the television set, when mounted thereon, to be rotated around a vertical axis and which permits the relative elevation of said television set to occur in a vertical direction between preselected angles of elevation, the mounting assembly comprising, in combination:

a support tray having a generally planar support surface which is adapted to support a television set, a mounting bracket adapted to be fastened to the mounting surface to secure said mounting assembly to said mounting surface, a support arm rotatably engaging said mounting bracket and extending from said mounting bracket to said support tray, the support arm having distinct first and second portions, the support arm first portion passing through at least one opening disposed in a portion of said mounting bracket, said support arm first portion having a radial flange which engages a portion of said mounting bracket proximate to said mounting bracket opening, the support member second portion including an extension in the form of a transverse arm extending transversely to said support member second portion, said transverse arm being fastened to said support arm second portion by way of a fastener extending through said transverse arm and support arm second portion, the fastener, at one end thereof, engaging an outer surface of said transverse arm and engaging, at an opposite end thereof, an anchor plate held by said support arm second portion, whereby said fastener draws said support arm second portion and said transverse arm together into contact when tightened, said support arm second portion further including a cove portion adapted to engage the transverse arm outer surface, the cove portion being defined by two longitudinally extending ledge portions which provide resistance against torque loads applied to said support tray by said television set, the support tray relative adjustment means including an adjustment bracket extending from said support tray and a retainer engaging said support member second portion, the adjustment bracket including at least one track member adapted to fixedly engage an adjustment screw of said retainer, the support tray supportingly contacting said transverse arm outer surface and said support tray being rotatably attached to two end portions of said transverse arm, the transverse arm end portions being rotatably held by said transverse arm, whereby said support tray and said transverse arm end portions may rotate relative to said transverse arm without interrupting the supporting contact between said support tray and said transverse arm.

12. The mounting assembly of claim 11, wherein said mounting bracket has a substantially planar mounting face adapted to be mounted on a generally vertical wall surface.

13. The mounting assembly of claim 11, wherein said mounting bracket has at least one substantially planar mounting surface adapted to be mounted on a generally horizontal surface.

14. The mounting assembly of claim 11, wherein said transverse arm includes a hollow, cylindrical pipe and said support member second portion includes a hollow cylindrical pipe.

15. The mounting assembly of claim 11, wherein said mounting bracket includes a pair of endwalls, a pair of stiffening flanges extending between said endwalls, each of said endwalls including an opening adapted to receive therethrough said support arm first portion.

16. The mounting assembly of claim 11, wherein said support arm first portion lies in a generally vertical plane and said support arm second portion lies in a generally horizontal plane.

17. The mounting assembly of claim 11, wherein said support tray includes at least one engagement recesses which is adapted to engage mounting television.

18. The mounting assembly of claim 9, wherein said support tray includes a plurality of engagement recesses, each of said engagement recesses having at least one surface adapted to abut a surface of a mounting lug and further having an opening extending through said support tray, said opening being adapted to permit the passage of a fastener therethrough.

19. A kit of parts for use in assembling a rotatable television mounting assembly, which when assembled, form a television mounting assembly which is rotatable around a vertical axis, comprising:

a mounting bracket, an arm extending from the mounting bracket and a tray supported by the arm;

said mounting bracket having means for rotatably receiving one end of said arm and means for mounting said bracket on a substantially planar surface;

said arm including first and second portions, the arm first portion including means for engaging a portion of said mounting bracket in the form of a collar, the collar including a radially extending flange, the flange having support surface which engages said mounting bracket portion, the arm second portion extending generally outwardly from said arm first portion, said arm second portion having an extension member extending transversely therefrom, the extension member including a pair of endcaps capable of rotation within said extension member, the endcaps being disposed at opposing ends of said extension member;

the tray having a substantially planar television mounting surface, said tray being disposed on said extension member in a manner such that a predetermined length of said extension member contacts said tray in a surface-to-surface relationship, said tray being connected to said extension member end caps, whereby rotation of said end caps within said extension member induces rotation in said tray about a horizontal axis of said extension member, yet said tray is maintained in said surface-to-surface contact with said extension member predetermined length, said tray further including means for adjusting the elevation of said tray with respect to said extension member horizontal axis, the tray adjusting means including a retaining strap secured to said support arm and providing a track member extending from said tray and engaging said retaining strap.

20. A kit according to claim 19, wherein said extension member is a hollow cylindrical cube and said arm is a hollow cylindrical tube, an end of said arm second portion having a cove, the cove substantially engaging an outer surface of said extension member, the arm second portion end further having two extending lip members defining said case, said lip members providing resistance to forces developed in said tray which tend to rotate said extension member about said support arm second portion.

21. A kit according to claim 19, wherein said extension member is releasably connected to said arm by way of a fastener extending through said extension member and projecting into said arm, the extension member fastener engaging an anchor plate held within a slot disposed in said arm, whereby said extension maker fastener draws said extension member into contact with said arm.

22. A kit according to claim 19, wherein said tray includes an upwardly extending flange disposed along a front edge thereof and said tray further includes means in engaging lug member, attached to a television, said engagement means including at least one depression disposed in said television mounting surface, the depression being adapted to engage a positioning lug.

* * * * *